United States Patent [19]

Hiramatsu et al.

[11] Patent Number: 5,574,450
[45] Date of Patent: Nov. 12, 1996

[54] SYNCHRONIZATION ADDER CIRCUIT

[75] Inventors: Katsuhiko Hiramatsu; Kazunori Inogai, both of Yokohama; Kimihiko Ishikawa, Funabashi, all of Japan

[73] Assignee: Matsushita Electric Industrial Co., Ltd., Osaka, Japan

[21] Appl. No.: 302,029

[22] Filed: Sep. 9, 1994

[30] Foreign Application Priority Data

Sep. 10, 1993 [JP] Japan ..................... 5-248600

[51] Int. Cl.⁶ .......................................... H03M 1/48
[52] U.S. Cl. .............................. 341/112; 375/324
[58] Field of Search ........................ 341/112, 157, 341/116; 375/324, 335

[56] References Cited

U.S. PATENT DOCUMENTS

| | | | |
|---|---|---|---|
| 4,726,041 | 2/1988 | Prohaska et al. | 375/91 |
| 4,941,155 | 7/1990 | Chuang et al. | 375/84 |
| 5,170,413 | 12/1992 | Hess et al. | 375/38 |

FOREIGN PATENT DOCUMENTS

| | | |
|---|---|---|
| 61-045658 | 3/1986 | Japan . |
| 2165110 | 4/1986 | United Kingdom . |

*Primary Examiner*—Todd DeBoer
*Attorney, Agent, or Firm*—Lowe, Price, LeBlanc & Becker

[57] ABSTRACT

A synchronization adder circuit for digital data communication includes an A/D converter, a waveform-shaping circuit, a square circuit, a low-pass filter, and an adder. The A/D converter samples at given sampling points in time per sampling cycle a received signal transmitted through a plurality of subcarriers to digitize sampled values to provide digital signals. The waveform-shaping circuit then waveform-shapes the digital signals from said A/D converter without decomposing them with respect to each subcarrier. The square circuit squares the output signals from the waveform-shaping circuit. The low-pass filter removes a given high-frequency component from output signals from the square circuit. The adder adds values of output signals from the low-pass filter at each sapling point for preselected sapling cycles to determine the samples suitable for reproduction of original data.

6 Claims, 4 Drawing Sheets

SYNCHRONIZATION ADDER CIRCUIT

BACKGROUND OF THE INVENTION

1. Technical Field of the Invention

The present invention relates generally to a synchronization adder circuit which may be employed in a receiver of a digital communication system to synchronously add the power of sampled received signals, and more particularly to such a synchronization adder circuit having an improved compact structure.

2. Background Art

In a known digital communication system, a receiver samples signal levels of a received signal at time intervals corresponding to transmission intervals at which a transmitter transmits symbols (1, 0), and compares them with a threshold value to reproduce original symbols.

For transmission of digital data in a narrow band, the Nyquist characteristic is generally used. The same filter having the root Nyquist properties is usually employed both in transmitter and receiver. In such digital transmission, the sampling timing where a symbol is sampled from a received signal can be determined based on a maximum point of the envelope of the received signal unless a limiter amplifier is used as a receiver amplifier.

The receiver digitizes the received signal at a sampling frequency that is an integral multiple (N) of a symbol-clock frequency, synchronously adds a square mean of samples at Nth sample points in time, and then identifies the samples at the Nth sample points having a maximum square means as indicating transmitted symbols.

In order to enhance the communication efficiency, known digital communication usually uses a plurality of subcarriers whose carrier frequencies are gradually shifted from the center frequency for transmitting a great deal of data. It is possible to improve the detection ability of symbol-timing (i.e., the symbol-clock frequency) by using the sum of the envelopes of the subcarriers.

FIG. 5 shows a conventional synchronization adder circuit which includes generally A/D converters 21 and 22, frequency converters 31, 32, 33, and 34, waveform-shaping filters 51, 52, 53, 54, 55, 56, 57, and 58, square circuits 71, 72, 73, 74, 75, 76, 77, and 78, an adder 81, an adder circuit 82, a memory 83, and a discrimination point detecting circuit 84.

The A/D converter 21 digitizes the same phase component 11 (I signal) of a received signal on each subcarrier at a sampling frequency of N times a symbol-clock frequency. The A/D converter 22 digitizes at the same sampling frequency an orthogonal component 12 (Q signal) of the received signal on each subcarrier. The frequency convert 31 to 34 frequency-convert the digital signals 23 and 24 on each subcarrier outputted from the A/D converters 21 and 22 to have their central frequencies agree with one another. The waveform-shaping filters 51 to 58 waveform-shape with the same filtering properties the I and Q signals on each subcarrier whose center frequencies have agreed with each other. The square circuits 71 to 78 square the waveform-shaped signals 61 to 68, respectively. The adder 81 forms the sum of outputs from the square circuits 71 to 78. The adder circuit 82 adds an output value from the adder 81 to the sum of the outputs from the square circuits 71 to 78 derived at a previous corresponding sampling point which, in turn, is stored in a given location, one for each sampling point, of the memory 83.

Note that the synchronization adder circuit shown in FIG. 4 receives data transmitted on four subcarriers and an A/D conversion is made seven times (N=7) per sampling cycle.

In operation, data transmitted on four subcarriers is separated by means of orthogonal detection into the I and Q signals which are, in turn, inputted into the A/D converters 21 and 22 wherein they are digitized at a sampling frequency of seven times the symbol-clock frequency.

Subsequently, the digitized I and Q signals are inputted into the frequency converters 31 to 34. The four subcarriers have carrier frequencies which are shifted from the center frequency by $-3\Delta\omega$, $-\Delta\omega$, $\Delta\omega$, and $3\Delta\omega$, respectively. Each frequency converter 31 to 34 is thus arranged to frequency-converts the I and Q signals to have the center frequencies thereof coincide with one another (0 Hz) for taking a corresponding subcarrier out of the I and Q signals. FIGS. 6(a) and 6(b) show the frequency conversion in the frequency converters. For example, a central frequency offset by $\Delta\omega$, as shown in FIG. 6(a), is shifted by $+\Delta\omega$ into a central frequency zero shown in FIG. 6(b).

The signals 41 to 48 processed by the frequency converters 31 to 34 are inputted into the waveform-shaping circuits 51 to 58. These waveform-shaping circuits are designed to extract, as shown in FIG. 6(c), a signal in a frequency range defined by the same width across the center frequency.

The outputs from the waveform-shaping circuits 51 to 58 are squared in the square circuits 71 to 78 to derive the envelopes thereof. The outputs of the square circuits 71 to 78 are then added in the adder 81 to form the sum of the envelopes of the four subcarriers.

A value provided by the adder 81 is added in the adder circuit 82 to a value already stored in a corresponding memory location of the memory 83. The memory 83 has seven memory locations each storing a total value of samples derived at corresponding sampling points in past sapling cycles. For example, when an instantaneous value of the adder 81 is derived at the second sampling point, the sum of samples obtained at the second sampling points in previous sampling cycles is first read out of the second memory location of the memory 83 and then is added to the value currently derived by the adder 81 which, in turn, is stored in the second memory location of the memory 83 again.

The discrimination point detecting circuit 84 detects in the memory 83 a maximum total value of the samples extracted at individual sampling points for given sapling cycles, and identifies the samples having the maximum total value as optimum samples for reproduction of symbols.

The above prior art synchronization adder circuit, however, encounters the drawback in that in order to derive the envelopes of four subcarriers, it is necessary to perform frequency-conversion four times and filtering process eight times, as discussed above. In other words, the frequency conversions of a number corresponding to the number of subcarriers and the filtering processes of twice the number of subcarriers are required. This results in bulky hardware of the circuit. Alternatively, in the case where the above variety of operations are executed in software, it becomes difficult to perform such operations in real time.

SUMMARY OF THE INVENTION

It is therefore a principal object of the present invention to avoid the disadvantages of the prior art.

It is another object of the present invention to provide a compact structure of a synchronization adder circuit which does not require a frequency converter with decreased waveform-shaping filters.

According to one aspect of the present invention, there is provided a synchronization adder circuit which comprises an A/D converter means for sampling at given sampling points in time per sampling cycle a received signal transmitted through a plurality of subcarriers to digitize sampled values to provide digital signals, a waveform-shaping circuit means for waveform-shaping the digital signals from the A/D converter means without decomposing them for every subcarrier, a square means for squaring output signals from the waveform-shaping circuit means, a low-pass filter removing a given high-frequency component from output signals from the square means, and an adder means for adding values of output signals from the low-pass filter at each sampling point for preselected sampling cycles.

According to another aspect of the invention, there is provided a synchronization adder circuit which comprises a first A/D converter for digitizing at given sampling points per sampling cycle the same phase component of an input signal transmitted on each of a plurality of subcarriers, a second A/D converter for digitizing at the given sampling points per sampling cycle an orthogonal component of the input signal transmitted on each subcarrier, a first waveform-shaping filter for waveform-shaping an output signal from the first A/D converter through a preselected filtering process, a second waveform-shaping filter for waveform-shaping an output signal from the second A/D converter through the preselected filtering process, a first square circuit for squaring an output signal from the first waveform-shaping circuit, a second square circuit for squaring an output signal from the second waveform-shaping circuit, a first adder circuit for forming the sum of output signal values from the first and second square circuits, a low-pass filter for removing a preselected high-frequency component from an output signal from the first adder circuit, a second adder circuit for adding output signal values derived from the low-pass filter at each sampling point over preselected sampling cycles to determine total values at the sampling points respectively, and a detecting circuit for detecting a maximum value of the total values to identify the output signal values from the low-pass filter at a specified sampling point representing the maximum value as samples for reproduction of data transmitted through the subcarriers.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
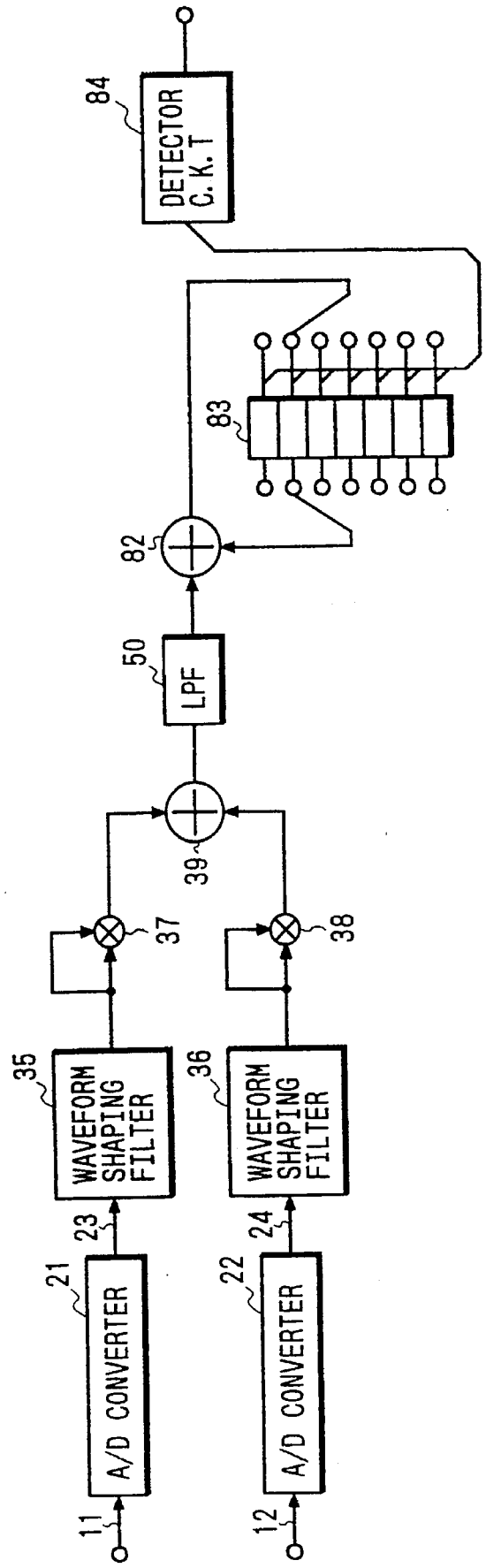
FIG. 1 is a circuit diagram which shows a synchronization adder circuit according to the present invention.

Referring now to the drawings, particularly to FIG. 1, there is shown a synchronization adder circuit 100 according to the present invention.

The adder circuit 100 includes generally A/D converters 21 and 22, synthetic waveform-shaping filters 35 and 36, square circuits 37 and 38, an adder 39, a low-pass filter (LPF) 50, an adder circuit 82, a memory 83, and a discrimination point detecting circuit 84.

The A/D converter 21 digitizes the same phase component 11 (I signal) of a received signal on each subcarrier at a sampling frequency of several times a symbol-clock frequency. The A/D converter 22 digitizes at the same sampling frequency an orthogonal component 12 (Q signal) of the received signal of each subcarrier. The synthetic waveform-shaping filters 35 and 36 are designed to waveform-shape the I and Q signals 11 and 12 without modifying in frequency the subcarriers. The square circuits 37 and 38 square the outputs from the synthetic waveform-shaping filters 35 and 36, respectively. The adder 39 forms the sum of the outputs of the square circuits 37 and 38. The LPF 50 removes high-frequency components from the squared signal outputted from the adder 39. The adder circuit 82 adds an output value from the LFP 50 to a corresponding total value stored in the memory 83, as discussed in the introductory part of this specification. The memory 83 has memory locations each storing therein a total value of samples derived at corresponding sampling points in time. The discrimination point detecting circuit 84 looks up a maximum value of the total values stored in the memory 83 to determine samples to be reproduced as original symbols.

Figure 2A:
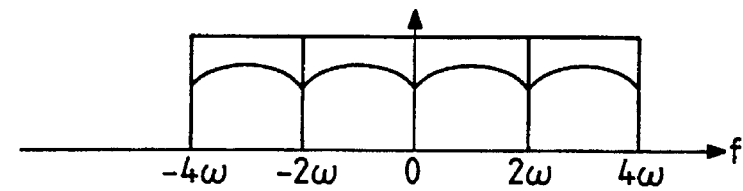
FIG. 2(a) shows frequency characteristics of four subcarriers before they are inputted to frequency converters.

To the A/D converters 21 and 22 are inputted the same phase components 11 and the orthogonal components 12 of received signals carried by four subcarriers, as shown in FIG. 2(a). The A/D converters 21 and 22 then digitize the input signals at a sapling rate that is an integral multiple (N) of a symbol-clock rate (i.e., symbol-clock frequency) to provide digital signals 23 and 24, respectively.

Figure 2B:
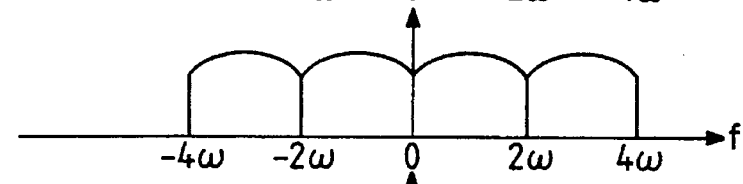
FIG. 2(b) shows frequency characteristics of four subcarriers after they have passed through waveform-shaping circuits.

The synthetic waveform-shaping filters 35 and 36 each have a function of combining respective filtering effects, as shown by squares in FIG. 2(a), of typical baseband waveform-shaping filters each frequency-converting the digital signals 23 and 24 according to a frequency shift from a center frequency of each subcarrier, and are designed to waveform-shape the subcarriers without decomposing them to provide a signal as shown in FIG. 2(b).

Figure 3:
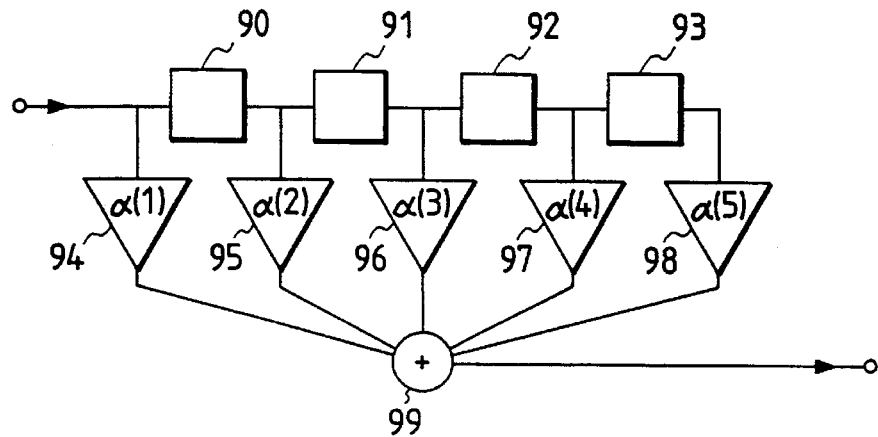
FIG. 3 is a circuit diagram which shows a structure of a synthetic waveform-shaping filter employed in a synchronization adder circuit of the invention.

Each of the synthetic waveform-shaping filter 35 and 36, as shown in FIG. 3, includes delay elements 90 to 93, multipliers 94 to 98 having filter coefficients $\alpha(1)$ to $\alpha(5)$, and an adder 99, and is provided by setting a filter coefficient of a low-pass wave filter in the following manner.

Figure 4A:
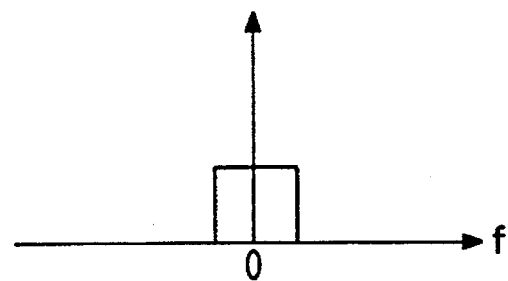
FIGS. 4(a), 4(b), and 4(c) are illustrations which show frequency characteristics when determining filter coefficients of a synthetic waveform-shaping filter of the invention.

A filter coefficient $\alpha(k)$ (k=1, 2, ... N) of a low-pass wave filter shown in FIG. 4(a) is first modified according to a relation below to establish a filter shown in FIG. 4(b) having a filter coefficient $\alpha_1(k)$.

$$\alpha_1(k) = \alpha(k) \cos(\omega \cdot T \cdot k)$$

where T denotes a time interval of the delay element, $\omega$ is the central frequency, and k is a constant corresponding to each of the suffixes of the filter coefficients $\alpha_1$ to $\alpha_5$ of the multipliers 94 to 98.

Figure 4B:
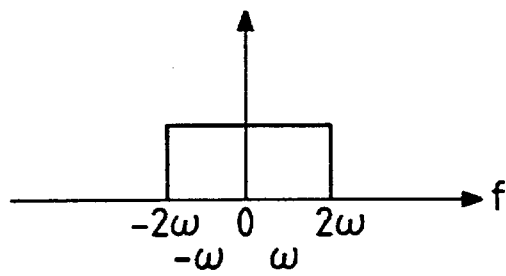
Figure 4C:
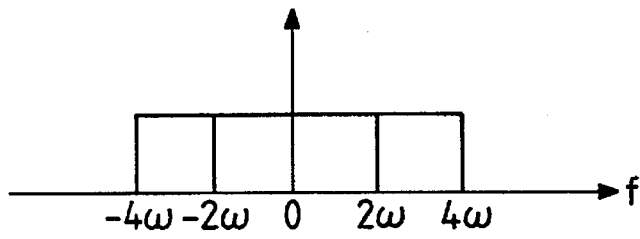
Figure 6A:
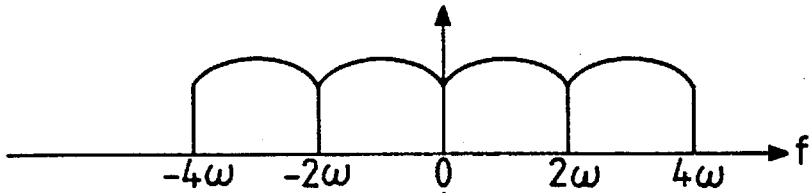
FIGS. 6(a) shows frequency characteristics of four subcarriers before they are inputted to frequency converters.
Figure 6B:
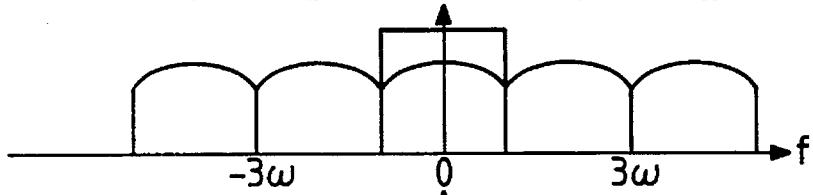
FIG. 6(b) shows frequency characteristics of four subcarriers after having been modulated in frequency through frequency converters.
Figure 6C:
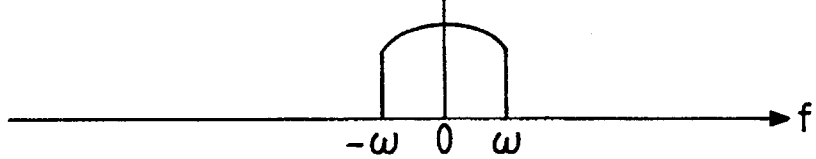
FIG. 6(c) show frequency characteristics derived by a waveform-shaping circuits.
Figure 5:
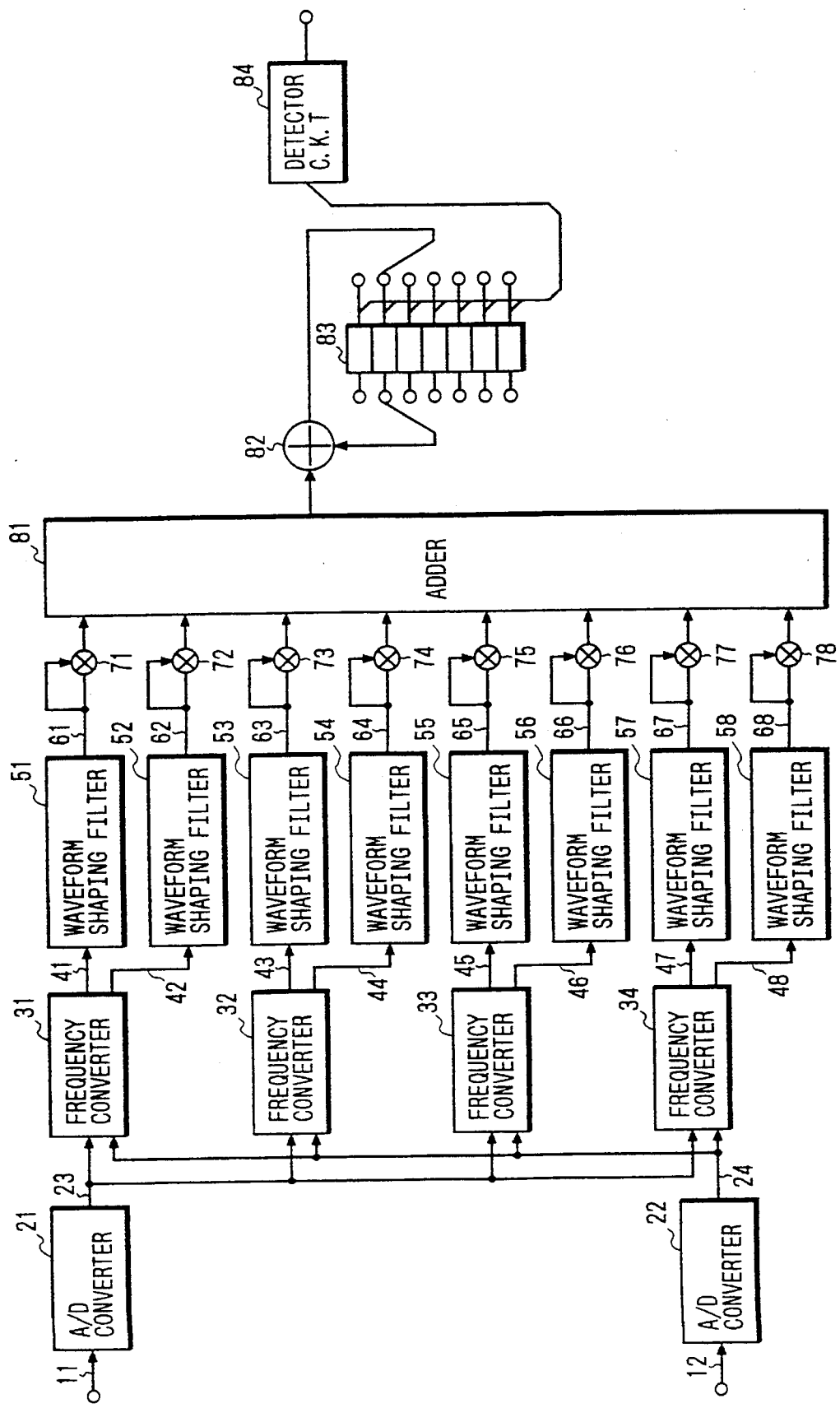
FIG. 5 is a circuit diagram which shows a conventional synchronization adder circuit.

Next, the filter coefficient $\alpha_1(k)$ of the filter shown in FIG. 4(b) is further modified according to an equation below to derive a filter coefficient $\alpha_2(k)$ which provides filtering properties shown in FIG. 4(c).

$$\alpha_2(k) = \alpha_1(k) \cos(2\omega \cdot T \cdot k)$$

In the above manner, the synthetic waveform-shaping filters 35 and 36 are each designed to have passbands whose central frequencies correspond to the central frequencies of the subcarriers, respec. Usually, the selection of a filter coefficient and the number of taps (i.e., the number of delay elements and multipliers) determine the performance of a filter.

Figure 2C:
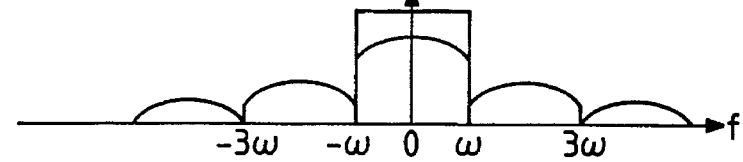
FIG. 2(c) shows frequency characteristics of output signals after they have passed through an adder.
Figure 2D:
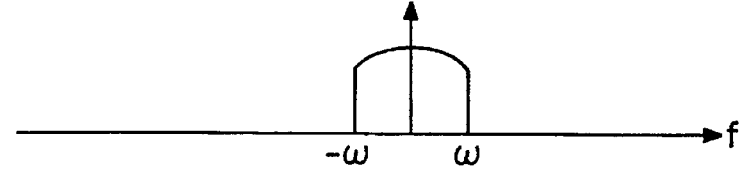
FIG. 2(d) shows frequency characteristics of a signal processed by a low-pass filter.

The output signals from the synthetic waveform-shaping filters 35 and 36 are squared by the square circuits 37 and 38 which are, in turn, added in the adder 39. The square operations of the square circuits 37 and 38 cause an output signal from the adder 39, as shown in FIG. 2(c), to include, in addition to an envelope component, unwanted components twice, four times, and six times the envelope component. These components are then removed by a filtering function, as shown by a square in FIG. 2(c), of the low-pass filter 50, so that only a signal having the envelope shown in FIG. 2(d) is inputted to the adder circuit 82.

The adder circuit 82 then adds the output from the low-pass filter 50 to a corresponding total value, derived in previous sampling cycles, stored in the memory 83. The discrimination point detecting circuit 84 looks up a maximum value of the total values stored in the memory 83 which are derived at individual sampling points over past sampling cycles. The samples showing the maximum value are identified as optimum samples for reproduction of original symbols.

The operation of the synchronization adder circuit until the envelope signal is obtained, will be discussed below with reference to mathematical equations.

An input signal A to the synchronization adder circuit transmitted by four subcarriers can be expressed according to the equation (1) below. The suffixes "1, 2, 3, 4" indicate the numbers of subcarriers 1, 2, 3, 4 respectively. The equation (1) is derived based on the relations (2), (3), (4), and (5) below.

$$A = a_1 e^{j\theta_1} e^{-j3\Delta\omega t} + a_2 e^{j\theta_2} e^{-j\Delta\omega t} + a_3 e^{j\theta_3} e^{j\Delta\omega t} + a_4 e^{j\theta_4} e^{j3\Delta\omega t} \tag{1}$$

$$i_1 + jq_1 = a_1 e^{j\theta_1} \tag{2}$$

$$i_2 + jq_2 = a_2 e^{j\theta_2} \tag{3}$$

$$i_3 + jq_3 = a_3 e^{j\theta_3} \tag{4}$$

$$i_{24} + jq_4 = a_4 e^{j\theta_4} \tag{5}$$

Taking into consideration the frequency offset $\omega_{off}$ of the input signal to the synchronization adder circuit, the input signal may also be presented by the following equation.

$$A' = A \times e^{j\omega_{off} t} \tag{6}$$

The above signal A' is waveform-shaped in the synthetic waveform-shaping filters 35 and 36, squared by the square circuits 37 and 38, and then inputted to the adder 39. The output from the adder 39 can be expressed by $$|A'^2| = A' \times A'^* = A e^{j\omega_{off} t} \times A^* e^{-j\omega_{off} t} = \tag{7}$$

$$(a_1 e^{j\theta_1} e^{-j3\Delta\omega t} + a_2 e^{j\theta_2} e^{-j\Delta\omega t} + a_3 e^{j\theta_3} e^{j\Delta\omega t} + a_4 e^{j\theta_4} e^{j3\Delta\omega t}) \times$$

$$(a_1 e^{-j\theta_1} e^{j3\Delta\omega t} + a_2 e^{-j\theta_2} e^{j\Delta\omega t} + a_3 e^{-j\theta_3} e^{-j\Delta\omega t} + a_4 e^{-j\theta_4} e^{-j3\Delta\omega t}) =$$

$$a_1^2 + a_2^2 + a_3^2 + a_4^2 +$$

$$a_1 a_2 e^{-j2\Delta\omega t} e^{j(\theta_1-\theta_2)} + a_1 a_3 e^{-j4\Delta\omega t} e^{j(\theta_1-\theta_3)} +$$

$$a_1 a_4 e^{-j6\Delta\omega t} e^{j(\theta_1-\theta_4)} + a_2 a_1 e^{j2\Delta\omega t} e^{j(\theta_2-\theta_1)} +$$

$$a_2 a_3 e^{-j2\Delta\omega t} e^{j(\theta_2-\theta_3)} + a_2 a_4 e^{-j4\Delta\omega t} e^{j(\theta_2-\theta_4)} +$$

$$a_3 a_1 e^{j4\Delta\omega t} e^{j(\theta_3-\theta_1)} + a_3 a_2 e^{j2\Delta\omega t} e^{j(\theta_3-\theta_2)} +$$

$$a_3 a_4 e^{-j2\Delta\omega t} e^{j(\theta_3-\theta_4)} + a_4 a_1 e^{j6\Delta\omega t} e^{j(\theta_4-\theta_1)} +$$

$$a_4 a_2 e^{j4\Delta\omega t} e^{j(\theta_4-\theta_2)} + a_4 a_3 e^{j2\Delta\omega t} e^{j(\theta_4-\theta_3)} =$$

$$(i_1^2 + q_1^2) + (i_2^2 + q_2^2) + (i_3^2 + q_3^2) + (i_4^2 + q_4^2) +$$

$$\{(i_1 i_2 + q_1 q_2) + (i_2 i_3 + q_2 q_3) + (i_3 i_4 + q_3 q_4)\} \cos(2\Delta\omega t) +$$

$$\{(i_1 i_3 + q_1 q_3) + (i_2 i_4 + q_2 q_4)\} \cos(4\Delta\omega t) +$$

$$(i_1 i_4 + q_1 q_4) \cos(6\Delta\omega t)$$

As apparent from the above equation (7), the output from the adder 39 includes a component of the envelope "$(i_1^2 + q_1^2) + (i_2^2 + q_2^2) + (i_3^2 + q_3^2) + (i_4^2 + q_4^2)$" and high-frequency components of twice, four times, and six times the envelope component. These high-frequency components are removed by the low-pass filter 50. Only envelope data, as defined by the following equation (8), is thus provided to the adder circuit 82.

$$(i_1^2 + q_1^2) + (i_2^2 + q_2^2) + (i_3^2 + q_3^2) + (i_4^2 + q_4^2) \tag{8}$$

In this manner, the envelope data is derived in the synchronization adder circuit of the invention using the two synthetic waveform-shaping filters, the square circuits squaring the outputs from the synthetic waveform-shaping filters, and the low-pass filter removing the high-frequency components produced through the square operation of the square circuits.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A synchronization adder circuit comprising:

A/D converter means for sampling at given sampling points in time per sampling cycle a received signal transmitted through a plurality of subcarriers to digitize sampled values to provide digital signals;

waveform-shaping circuit means for waveform-shaping the digital signals from said A/D converter means without decomposing them for every subcarrier;

square means for squaring output signals from said waveform-shaping circuit means;

a low-pass filter removing a given high-frequency component from output signals from said square means; and adder means for adding values of output signals from said low-pass filter at each sampling point for preselected sampling cycles.

2. A synchronization adder circuit as set forth in claim 1, wherein said waveform-shaping circuit means includes a waveform-shaping filter having passbands whose central frequencies correspond to central frequencies of the subcarriers, respectively.

3. A synchronization adder circuit comprising:

a first A/D converter for digitizing at given sampling points per sampling cycle the same phase component of an input signal transmitted on each of a plurality of subcarriers;

a second A/D converter for digitizing at said given sampling points per sapling cycle an orthogonal component of the input signal transmitted on each subcarrier;

a first waveform-shaping filter for waveform-shaping an output signal from said first A/D converter through a preselected filtering process;

a second waveform-shaping filter for waveform-shaping an output signal from said second A/D converter through the preselected filtering process;

a first square circuit for squaring an output signal from said first waveform-shaping circuit;

a second square circuit for squaring an output signal from said second waveform-shaping circuit;

a first adder circuit for forming the sum of output signal values from said first and second square circuits;

a low-pass filter for removing a preselected high-frequency component from an output signal from said first adder circuit;

a second adder circuit for adding output signal values derived from said low-pass filter at each sampling point over preselected sampling cycles to determine total values at the sampling points respectively; and a detecting circuit for detecting a maximum value of said total values to identify the output signal values from said low-pass filter at a specified sampling point representing said maximum value as samples for reproduction of data transmitted through the subcarriers.

4. A synchronization adder circuit as set forth in claim 3, wherein said first and second waveform-shaping filters each have passbands whose central frequencies correspond to central frequencies of the subcarriers, respectively.

5. A synchronization adder circuit comprising:

A/D converter means for sampling at given sampling points in time per sampling cycle a received signal transmitted through a plurality of subcarriers to digitize sampled values to provide concurrent digital signals;

waveform-shaping circuit means for waveform-shaping the concurrent digital signals from said A/D converter means without decomposing the digital signals for each of the plurality of subcarriers, said waveform-shaping circuit means outputting concurrent shaped output signals;

square means for squaring said concurrent shaped output signals from said waveform-shaping circuit means and outputting concurrent squared signals;

a low-pass filter removing a given high-frequency component from said concurrent squared signals from said square means, and outputting concurrent filtered signals; and adder means for adding values of said concurrent filtered signals from said low-pass filter at each sampling point for preselected sampling cycles, said synchronization adder circuit thereby being free of a requirement of frequency converting circuits for each of said plurality of subcarriers.

6. A synchronization adder circuit as recited in claim 5, wherein:

said A/D converter means comprises first and second converter means for sampling an in-phase component and an orthogonal component of the received signal, respectively and for outputting first and second concurrent digital signals respectively corresponding thereto;

said waveform-shaping circuit comprises first shaping means for waveform-shaping the first digital signals from said first converter means and outputting first shaped output signals, and second shaping means for waveform-shaping the second digital signals from said second converter means and outputting second shaped output signals;

said square means comprises first square means for squaring said first shaped output signals from said first shaping means and second square means for squaring said second shaped output signals from said second shaping means;

said first and second shaping means each comprising synthetic circuits including a plurality of filter coefficient setting means for setting filter coefficients, wherein said first and second shaping means have substantially identical filter coefficients.

* * * * *